United States Patent
Dzurko et al.

[11] Patent Number: 6,116,807
[45] Date of Patent: Sep. 12, 2000

[54] ROD END RETAINER SOCKET

[75] Inventors: Thomas Adam Dzurko, Macomb; Frank Joseph Arabia, Jr., Macomb Township, Macomb County; Donald Michael Perkins, Rochester Hills, all of Mich.

[73] Assignee: Delphi Technologies, Inc., Troy, Mich.

[21] Appl. No.: 09/241,999

[22] Filed: Feb. 2, 1999

[51] Int. Cl.[7] .................................. F16D 1/12; F16D 3/00
[52] U.S. Cl. .......................... 403/165; 403/164; 403/199; 403/329; 403/356
[58] Field of Search .................................. 403/165, 164, 403/199, 192, 329, 328, 319, 356

[56] References Cited

U.S. PATENT DOCUMENTS

| | | | |
|---|---|---|---|
| 2,784,987 | 3/1957 | Corcoran | 285/82 |
| 5,095,962 | 3/1992 | Lloyd-Davies et al. | 141/346 |
| 5,362,110 | 11/1994 | Bynum | 285/87 |
| 5,816,733 | 10/1998 | Ishikawa et al. | 403/329 |

*Primary Examiner*—Lynne H. Browne
*Assistant Examiner*—Ernesto Garcia
*Attorney, Agent, or Firm*—Kathryn A. Marra

[57] ABSTRACT

A socket pivotally retains the end of a rod that is inserted axially into the socket from either axial direction comprises a lever and two annular retaining clips. One clip is inserted into a hole in the lever from one side and the second clip is inserted into the first clip from an opposite side. The second clip has two sets of fingers at opposite ends that have lugs that engage an internal collar of the first clip to retain the clips in assembly with the lever. The second clip also has two more sets of finger at opposite ends that have catches that engage indents in the rod end to retain the rod end in the socket. The catches and indents are shaped so that the rod end can be inserted into the socket from either axial direction and retained in the socket irrespective of the axial direction of insertion.

8 Claims, 2 Drawing Sheets

ROD END RETAINER SOCKET

TECHNICAL FIELD

This invention relates to sockets and more particularly to a socket for pivotally retaining an end of a rod.

BACKGROUND OF THE INVENTION

Vehicle door latches typically have an inside latch lever and an inside lock lever that are operated by an inside door handle and an inside lock button that are located on the vehicle door a location that is remote from the door latch. The inside door handle and lock button are typically mechanically connected to the latch lever and the lock lever by operating rods. See for instance U.S. Pat. No. 5,535,553 granted to Brian H. Staser et al Jul. 16, 1996 for a superplug vehicle door module.

The operating rods may have a U-shaped end for mechanical connection as shown in FIGS. 5 and 6 of the '553 patent.

Often the operating rod has a simple right angled or L-shaped end that is pivotally engaged in a hole in the end of the latch lever or the lock lever which it operates with the end being retained in the hole by some sort of retainer clip. In the past, different retainer clips have been used for different applications of the door latch depending on the direction of axial insertion of the rod end into the latch or lock lever hole. The requirement for different retainer clips results in a proliferation of parts and needless expense. The requirement for different retainer clips also creates the possibility of a vehicle door latch having the wrong retainer clip for a given application which can raise havoc on an assembly line.

SUMMARY OF THE INVENTION

An object of the invention is to provide a rod end retainer socket for a vehicle door latch lever or the like that accepts a rod end from either axial direction so the parts inventory can be reduced and the possibility of an assembly having a wrong retainer clip for a given application can be avoided.

A feature of the invention is that the retainer socket is formed simply by inserting two clips into opposite ends of a hole in the part to which the rod end is to be pivotally retained.

Another feature of the invention is that the retainer socket is formed by snapping the two retainers together without any need for any additional fastener.

Still another feature of the invention is that the retainer sockets can be formed by molded plastic clips that are economical to manufacture.

Yet another feature of the invention is that the retainer socket engages the rod end at axially spaced locations to hold the rod end firmly in place.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE PREFERRED EMBODIMENT

Figure 1:
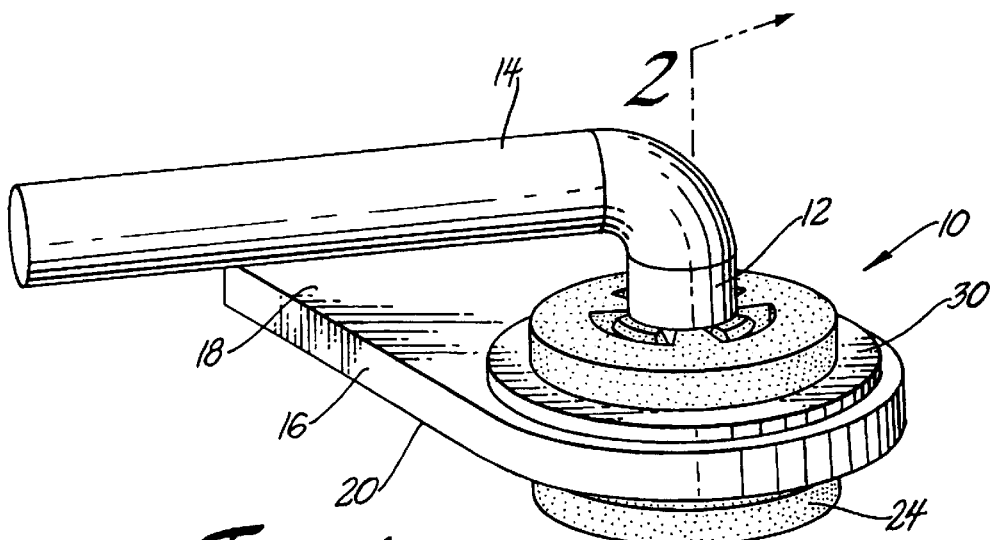
FIG. 1 is a perspective front view of a rod end retaining socket according to the invention.
Figure 2:
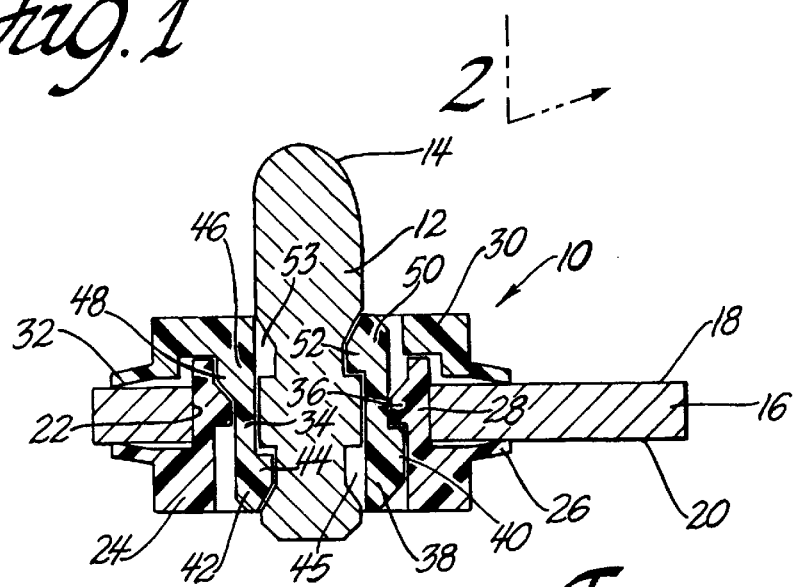
FIG. 2 is a section of the rod end retaining socket taken substantially along the line 2—2 of FIG. 1 looking in the direction of the arrows.

Referring now to the drawing, FIGS. 1 and 2 illustrate a retainer socket 10 for pivotally retaining the end 12 of a rod 14 that is inserted axially into the retainer socket 10 from either axial direction. Socket 10 comprises a support or other assembly part having a hole for receiving rod end 12 such as a vehicle door latch lever 16 and two annular clips 24 and 30 of molded plastic construction.

Lever 16 has a front side 18, a rear side 20 and a hole 22 that extends through the lever from the front side to the rear side. The first annular clip 24 has a resilient lip 26 that engages the rear side of lever 16 and a first tubular portion 28 that extends through hole 22 of lever 16. The second annular clip 30 has a resilient lip 32 that engages the front side of lever 16 and a second tabular portion 34 that nests in the first tubular portion 28 of annular clip 24.

Figure 3:
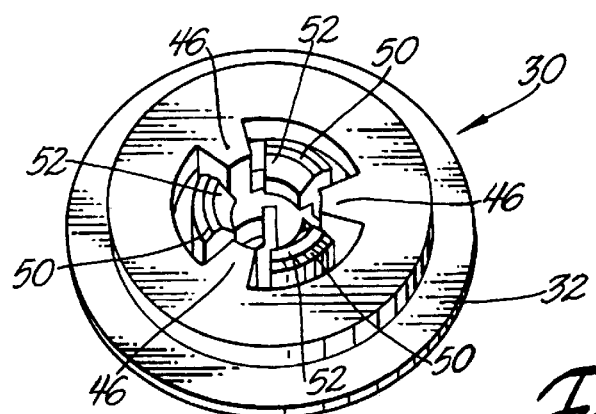
FIG. 3 is a front perspective view of an annular clip forming part of the rod retaining socket shown in FIG. 1.
Figure 4:
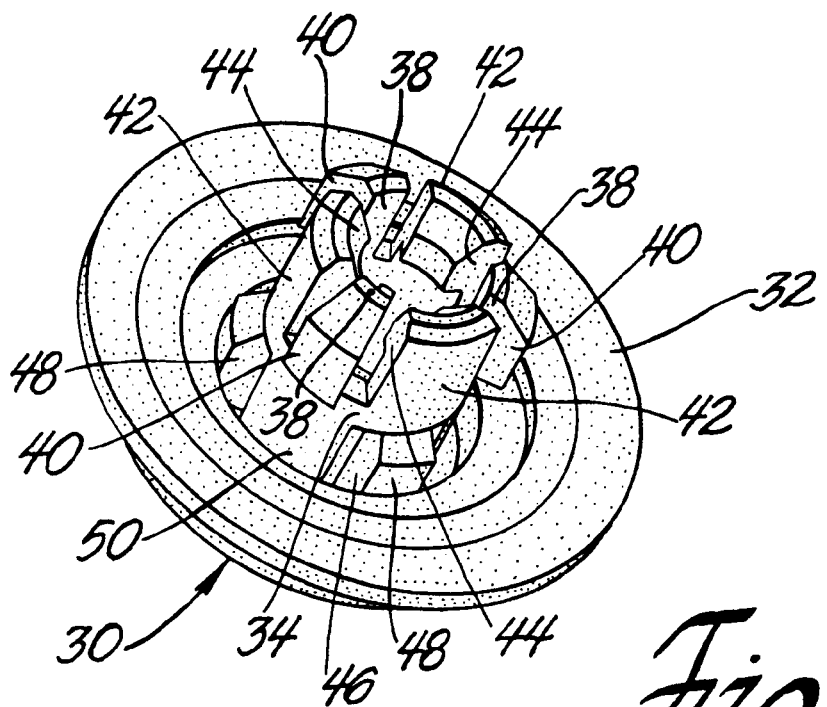
FIG. 4 is a rear perspective view of the annular clip shown in FIG. 3.
Figure 5:
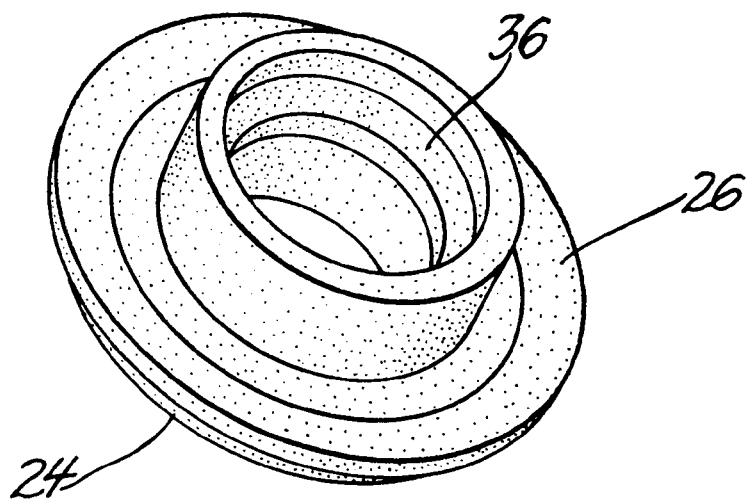
FIG. 5 is a front perspective view of another annular clip forming part of the rod retaining socket shown in FIG. 1.

Tubular portion 28 of clip 24 has an internal medial collar 36 for holding tubular portion 34 of clip 30 in place as best seen in FIGS. 2 and 5. Tubular portion 34 of clip 30 has two sets of fingers at opposite ends equipped with lugs that engage tubular portion 34 to hold clips 24 and 30 in place on lever 16 to form socket 10 as best seen in FIGS. 2, 3 and 4. Tubular portion 34 is preferably sized to receive the end 12 of the rod with a slip fit and has two more sets of fingers at opposite ends equipped with catches to retain the end 12 of rod 14 in socket 10.

Focusing now on FIGS. 3 and 4, tubular portion 34 of clip 30 has a first set of three circumferentially spaced axial fingers 38 at one end that have radially outwardly extending lugs 40 that engage a rear face of collar 36 to prevent clip 30 from being pulled out of clip 24. Tubular portion 34 also has a second set of three circumferentially spaced axial fingers 42 at the one end that are interdigitated with the first set of fingers 38. Fingers 42 have radially inwardly extending catches 44 that engage a first groove 45 in the end of rod 14 as shown in FIG. 2.

A third set of three circumferentially spaced axial fingers 46 are at an opposite end of tubular portion 34. Fingers 46 have radially outwardly extending lugs 48 that engage a front face of the collar to limit the insertion of clip 30 into the tubular portion 28 of clip 24. Fingers 38, 46 with lugs 40, 48 thus engage clips 24, 30 in assembly with lever 16 to form socket 10 as best shown in FIG. 2. Clips 24 and 30 are preferably retained by lugs 40 and 48 so that resilient lips 26 and 32 are deflected and biased against sides 18 and 20 to prevent rattling.

Tubular portion 34 also has a fourth set of three circumferentially spaced axial fingers 50 at the opposite end that are interdigitated with the third set of fingers 46 as best seen in FIG. 3. Fingers 50 have radially inwardly extending catches 52 that engage a second groove 53 in the rod end 12 that is spaced from groove 45 in the axial direction as best seen in FIG. 2. Thus fingers 42, 50 with catches 44, 52 retain rod end 12 in socket 10. The inner edges of catches 44 and 52 are chamfered radially inwardly toward the middle of socket 10 so that rod end 12 can be inserted into socket 10 from either axial direction. Moreover, catches 44 and 52 and the cooperating grooves 45 and 53 are shaped so that rod end 12 is retained in socket 10 by catches 44 and 52 irrespective of the axial direction of insertion into socket 10.

Socket 10 is assembled in the following manner. Plastic clip 24 is inserted into lever hole 22 from the rear side 20 and held in place. Plastic clip 30 is then inserted into plastic clip 24 from the front side until lugs 40 snap over collar 36 and engage the rear face of collar 36 as shown in FIG. 2. The faces of lugs 40 and the front face of collar 36 are ramped to facilitate the snap assembly. After the snap assembly, clips 24 and 30 are firmly attached to lever 16 in an anti-rattle fashion to form socket 10.

Rod end 14 can then be inserted into tubular portion 34 of clip 30 from either axial direction until catches 44 and 52 snap into grooves 45 and 53. When rod end 12 is inserted into the front side of socket 10, catches 44 and 52 snap into grooves 45 and 53 respectively to hold rod end 12 in the axial direction while tubular portion 34 holds rod end 12 in the radial direction as shown in FIG. 2. When rod end 12 is inserted into the rear side catches 44 and 52 snap into grooves 53 and 45 respectively.

The disclosed embodiment is representative of a presently preferred form of the invention, but is intended to be illustrative rather than definitive thereof. Obviously, many modifications and variations of the present invention in light of the above teachings may be made. It is, therefore, to be understood that, within the scope of the appended claims, the invention may be practiced otherwise than as specifically described.

We claim:

1. A socket for pivotally retaining the end of a rod that is inserted axially into the socket from either axial direction comprising;

a support, and two annular retaining clips, each clip having a resilient lip, a first one of the clips being inserted into a hole in the support from one side and a second one of the clips being inserted into the first clip from an opposite side, the second one of the clips having at least one finger at each end that has a lug that engages an internal collar of the first one of the clips to retain the two clips in assembly with the support, the second one of the clips also having at least one more finger at each end that has a catch that engages an indent in the rod end to retain the end of the rod in the socket, and the catches and the indents being shaped so that the end of the rod is insertable into the socket from either axial direction and retained in the socket irrespective of the axial direction of insertion.

2. A socket for pivotally retaining the end of a rod that is inserted axially into the socket from either axial direction comprising;

a support and two annular retaining clips, a first one of the clips being inserted into a hole in the support from one side and a second one of the clips being inserted into the first clip from an opposite side, the second one of the clips having two sets of fingers at opposite ends that have lugs that engage an internal collar of the first one of the clips to retain the two clips in assembly with the support, the second one of the clips having two more sets of fingers at opposite ends that have catches that engage indents in the rod end to retain the end of the rod in the socket, and the catches and the indents being shaped so that the end of the rod can be inserted into the socket from either axial direction and retained in the socket irrespective of the axial direction of insertion.

3. A dual directional rod retaining socket for pivotally retaining the end of a rod that is inserted axially into the retaining socket from either axial direction comprising:

a support having a front side, a rear side and a hole extending through the support from the front side to the rear side;

a first annular clip having a resilient lip engaging the rear side of the support and a first tubular portion extending through the hole of the support, and a second annular clip having a resilient lip engaging the front side of the support and a second tubular portion disposed in the first tubular portion of the first annular clip, the first tubular portion having an internal medial collar, the second tubular portion having a first set of circumferentially spaced axial fingers at one end that have radially outwardly extending lugs that engage a rear face of the collar, the second tubular portion having a second set of circumferentially spaced axial fingers at the one end that are interdigitated with the first set of fingers and that have radially inwardly extending catches for engaging a first groove in the end of the rod, the second tubular portion having a third set of circumferentially spaced axial fingers at an opposite end that have radially outwardly extending lugs that engage a front face of the collar, and the second tubular portion having a fourth set of circumferentially spaced axial fingers at the opposite end that are interdigitated with the third set of fingers and that have radially inwardly extending catches for engaging a second groove in the rod end.

4. The socket as defined in claim 3 wherein the first set of fingers are aligned with the fourth set of fingers in the axial direction and the second set of fingers are aligned with the third set of fingers in the axial direction.

5. The socket as defined in claim 3 wherein the radial inwardly extending catches of the second and the fourth set of catches are chamfered radially inwardly toward a middle of the socket to facilitate insertion of the rod end from either axial direction.

6. The socket as defined in claim 4 wherein the radial inwardly extending catches of the second and the fourth set of catches are chamfered radially inwardly toward a middle of the socket to facilitate insertion of the rod end from either axial direction.

7. The socket as defined in claim 6 wherein the outwardly extending lugs at the one end of the second tubular portion of the second annular clip and the collar have ramped faces to facilitate snap assembly of the second annular clip to the first annular clip.

8. The socket as defined in claim 3 wherein the first and second annular clips are of molded plastic construction.

* * * * *